United States Patent
Moon

(10) Patent No.: US 9,924,115 B2
(45) Date of Patent: Mar. 20, 2018

(54) APPARATUS AND METHOD FOR THREE-DIMENSIONAL INFRARED IMAGING OF SURFACES

(71) Applicant: Agilent Technologies, Inc., Santa Clara, CA (US)

(72) Inventor: Christopher Ryan Moon, Los Gatos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/863,128

(22) Filed: Sep. 23, 2015

(65) Prior Publication Data

US 2017/0085810 A1    Mar. 23, 2017

(51) Int. Cl.
*H04N 5/33* (2006.01)
*G01B 11/06* (2006.01)

(52) U.S. Cl.
CPC ........... *H04N 5/33* (2013.01); *G01B 11/0608* (2013.01)

(58) Field of Classification Search
CPC ....................................................... H04N 5/33
See application file for complete search history.

(56) References Cited

U.S. PATENT DOCUMENTS

| | | | |
|---|---|---|---|
| 4,141,032 A | 2/1979 | Haeusler | |
| 2002/0113210 A1 | 8/2002 | Treado | |
| 2003/0022105 A1* | 1/2003 | Prasad | A61K 41/008 430/270.15 |
| 2004/0114219 A1 | 6/2004 | Richardson | |
| 2007/0260419 A1* | 11/2007 | Hagiwara | 702/150 |
| 2008/0073525 A1* | 3/2008 | Gross | A61B 3/1015 250/307 |
| 2015/0185465 A1* | 7/2015 | Karube | |
| 2015/0362427 A1* | 12/2015 | Novotny | |

OTHER PUBLICATIONS

UK Search Report dated Mar. 14, 2017, Application No. GB1615872.7.

* cited by examiner

*Primary Examiner* — David Porta
*Assistant Examiner* — Hugh H Maupin

(57) ABSTRACT

A scanner and method for using the same are disclosed. The scanner includes a stage, a MIR light source, an imaging system, and a controller. The stage is adapted to hold a specimen to be imaged and to move the specimen in a first direction and in a second direction that is orthogonal to the lateral direction. The imaging system forms an image plane of the specimen when the stage is positioned at a second direction distance, z, from a known point in the imaging system. The imaging system forms a plurality of different image planes of the specimen at the illumination wavelength. Each of the plurality of image planes is characterized by a different value of z, the controller determining a value of z for each of a plurality of points on the specimen at which the point on the specimen is in focus.

16 Claims, 2 Drawing Sheets

APPARATUS AND METHOD FOR THREE-DIMENSIONAL INFRARED IMAGING OF SURFACES

BACKGROUND

Quantum cascade lasers provide a tunable mid-infrared (MIR) light source that can be used for spectroscopic measurements and images. Many chemical components of interest have molecular vibrations that are excited in the MIR region of the optical spectrum, which spans wavelengths between 5 to 25 microns. Hence, measuring the absorption of MIR light at various locations on a sample can provide useful information about the chemistry of the sample as a function of position on the sample.

Samples that are not flat and parallel to the imaging plane present challenges. In particular, parts of the sample will be out of focus which limits the resolution of the image in areas that are not in focus.

SUMMARY

The present invention includes a scanner and method for using the same. The scanner includes a stage, a MIR light source, an imaging system, and a controller. The stage is adapted to hold a specimen to be imaged and to move the specimen in a first direction and in a second direction that is orthogonal to the first direction. The MIR light source illuminates the specimen at an illumination wavelength. The imaging system is characterized by a depth of focus, the depth of focus being less than a maximum specimen height for which the imaging system is designed. The imaging system forms an image plane of the specimen when the stage is positioned at a second direction distance, z, from a known point in the imaging system. The controller causes the imaging system to form a plurality of different image planes of the specimen at the illumination wavelength. Each of the plurality of image planes is characterized by a different value of z, the controller determining a value of z for each of a plurality of points on the specimen at which the point on the specimen is in focus.

In one aspect of the invention, the values of z of the image planes depend on the depth of focus of the imaging system.

In another aspect of the invention, the controller causes the MIR light source to switch the illumination wavelength from a first wavelength to a second wavelength that is different from the first wavelength, the controller causing the imaging system to form a plurality of different image planes of the specimen at each of the first wavelength and the second wavelength, each of the plurality of image planes is characterized by a different value of z, the controller determining a value of z for each of a plurality of points on the specimen at which the point on the specimen is in focus.

In another aspect of the invention, the MIR light source includes a tunable MIR laser that generates a light beam having an illumination wavelength that varies as a function of an input signal, and the imaging system includes an optical assembly that focuses the light beam to a point on the specimen. The optical assembly also includes a scanning assembly having a focusing lens that focuses the light beam to a point on the specimen and a mirror that moves in a third direction relative to the stage such that the focusing lens maintains a fixed distance between the focusing lens and the stage. The first direction is different from the second direction. A first light detector measures an intensity of light leaving the point on the specimen.

In another aspect of the invention, the controller determines the value of z for one of the plurality of points on the specimen at which the point is in focus by determining an intensity for each point in the image planes corresponding to the point.

In another aspect of the invention, the controller determines the value of z for one of the plurality of points on the specimen at which the point is in focus by determining a spatial frequency intensity in a region that includes the point in each of the plurality of image planes.

In another aspect of the invention, the controller sets the stage such that a point on the specimen is in focus and measures the intensity of light as a function of the wavelength.

In another aspect of the invention, the controller generates a three-dimensional image of a surface of the specimen and displays the three-dimensional image on a user interface.

DETAILED DESCRIPTION

Figure 1:
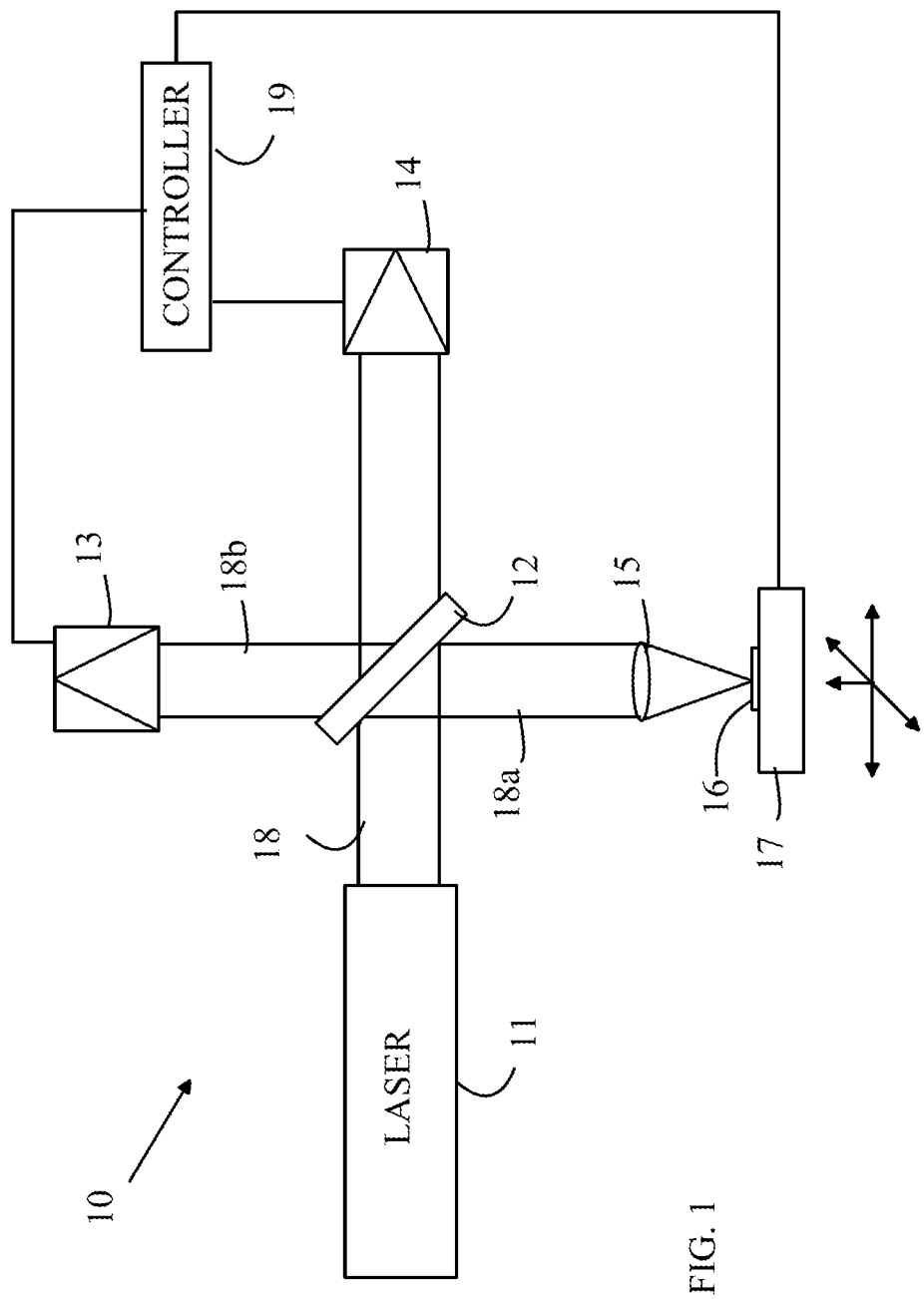
FIG. 1 illustrates one embodiment of a MIR imaging system according to the present invention.

Refer now to FIG. 1 which illustrates one embodiment of a MIR imaging system according to the present invention.

Imaging system 10 includes a quantum cascade laser 11 that generates a collimated light beam 18 having a narrow band of wavelengths in the MIR. In one aspect of the invention, quantum cascade laser 11 is a quantum cascade laser having a tunable wavelength that is under the control of a controller 19. Collimated light beam 18 is split into two beams by a partially reflecting mirror 12. Light beam 18a is directed to a lens 15 that focuses that beam onto a specimen 16 that is mounted on xyz-stage 17 that can position specimen 16 relative to the focal point of lens 15. Light that is reflected back from specimen 16 is collimated into a second beam that has a diameter determined by the aperture of lens 15 and returns to partially reflecting mirror 12 along the same path as light beam 18a. While the first and second beams are shown as having the same cross-section in FIG. 1, it is to be understood that the second beam could have a different cross-section than the first beam. A portion of the second beam is transmitted through partially reflecting mirror 12 and impinges on a first light detector 13 as shown at 18b. Light detector 13 generates a signal related to the intensity of light in beam 18b. Controller 19 computes an image as a function of position on specimen 16 by moving specimen 16 relative to the focal point of lens 15 using xyz-stage 17.

Controller 19 also monitors the beam intensity of the light in collimated light beam 18 using a second light detector 14 that receives a portion of the light generated by quantum cascade laser 11 through partially reflecting mirror 12. Quantum cascade laser 11 is typically a pulsed source. The intensity of light from pulse to pulse can vary significantly, and hence, the pixels of the image are corrected for the variation in intensity by dividing the intensity measured by light detector 13 by the intensity measured by light detector 14. In addition, since the light intensity from quantum cascade laser 11 is zero between pulses, controller 19 only sums the ratio of intensities from light detectors 13 and 14 during those times at which the output of light detector 14 is greater than some predetermined threshold. This aspect of the present invention improves the signal-to-noise ratio of the resultant image, since measurements between pulses contribute only noise, which is removed by not using measurements between pulses.

Figure 2:
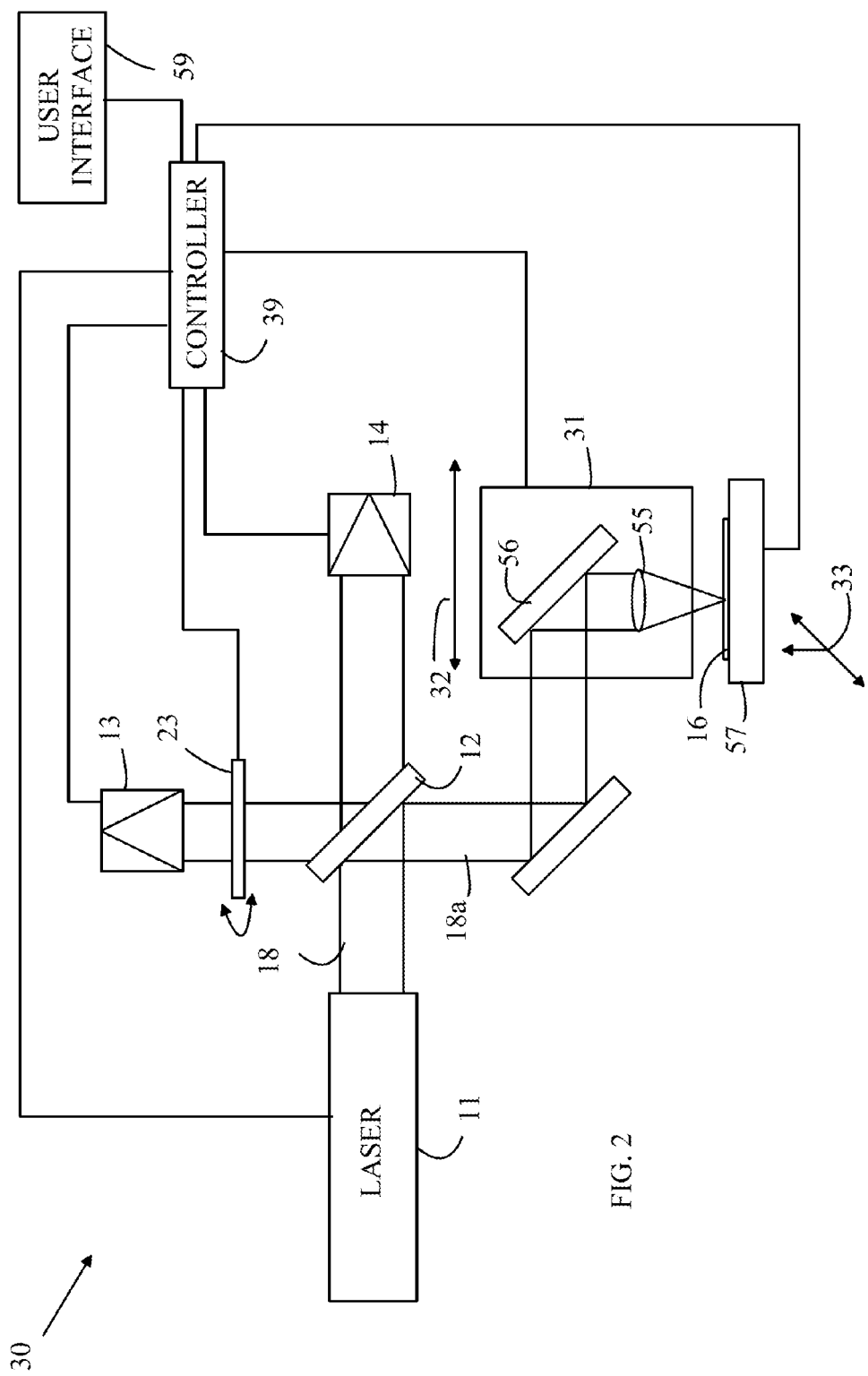
FIG. 2 illustrates another embodiment of an imaging system according to the present invention.

In the above described embodiments, the stage moves the sample in two dimensions during the generation of an image. However, the stage has a significant mass, and hence, the speed at which the sample is imaged is limited by the motion of the stage. In embodiments in which rapid imaging time is important, embodiments in which the specimen is scanned in one direction by moving lens 15 are preferred. Refer now to FIG. 2, which illustrates another embodiment of an imaging system according to the present invention. In imaging system 30, the stage assembly is divided into two components. Component 31 includes focusing lens 55 and is moveable in a direction shown at 32 such that a single line of the image is generated with each pass of component 31. Since focusing lens 55 and mirror 56 have a mass that is small compared to component 57, component 31 can be moved with much greater speed. In one embodiment, component 31 is mounted on a rail and moved in a manner analogous to a print head on an inkjet printer. The second component of the stage assembly is shown at 57. Component 57 includes the mounting mechanism for the specimen being scanned and moves in a direction 33 that is orthogonal to direction 32. Since component 57 only needs to move once per scan line, the slower speed of motion associated with the more massive component 57 is acceptable. Controller 39 controls the wavelength of quantum cascade laser 11, the axis of linear polarization filter 23, and the position of component 31.

The numerical aperture of focusing lens 55 is typically very large, and hence, the depth of focus is very limited. Accordingly, with non-flat samples or planar samples whose surfaces are not parallel to the xy plane, portions of the image will be out of focus. In principle, the imaging system could be refocused at each point prior to making the absorption measurements as a function of wavelength of the incident light. However, the time to change the z-setting of the sample at each point is prohibitive. Furthermore, in embodiments such as shown in FIG. 2, stopping the motion of component 31 defeats the advantage of this arrangement.

The present invention overcomes this problem by generating multiple images at different focal depths and then combining the images to determine the topology of the specimen. The absorption spectrum of the specimen at any given point can then be generated by setting the z-position of the specimen such that the point in question is in focus. The absorption as a function of wavelength of the incident light can then be measured.

The individual images at each fixed z-value will be referred to as image planes in the following discussion. A particular xy location in an image plane will be referred to as a "pixel". To determine the correct z-value for making measurements at any particular xy location on the specimen, the image plane at which that location was in focus must be determined. When the specimen is above or below the focal point of focusing lens 55, the size of the illumination spot on the specimen is significantly larger than when the specimen is at the focal point of focusing lens 55. Furthermore, the illuminated area is no longer at the focal point of focusing lens 55, and hence, the light collection efficiency of focusing lens 55 for the light reflected from the specimen is substantially reduced. As a result, the measured light from the pixel at an out of focus xy location on the specimen is typically less than that obtained when the location on the specimen is in focus unless some nearby location on the specimen that is now illuminated by the broadened spot has a very much higher reflectivity so as to compensate for the lost efficiency.

In one aspect of the invention, the controller measures the intensity of the pixel in question as a function of the z-position of the image plane. The z-value having the highest intensity for the pixel in question is chosen as the z-value at which the pixel is presumed to be in focus. Since the image planes only exist for a plurality of discrete z-values, determining the precise z-value at which the signal is maximal poses challenges if that z-value does not coincide with the z-value of a measured image plane. In one aspect of the invention, the z-values for the particular pixel in question are interpolated using a quadratic or higher interpolation algorithm to detect the z-value corresponding to the peak of the intensity as a function of z values that do not coincide with image planes.

In another aspect of the invention, the z-value corresponding to the height of a location on the sample is determined by analyzing the spatial frequencies in a region that includes the location in question. Consider a small region that includes the location in question. If the region is at the same height in the sample as the location, and the region includes some degree of "texture" or other features which vary in height or intensity over the region, the spatial frequencies within the region can provide information about the focus of the region. If the region is out of focus in a particular image plane, the high spatial frequencies in the image of that region will be reduced in intensity due to the blurring of the features. The intensity in the low spatial frequencies in that image plane will be reduced less. Hence, a quantity related to the ratio of intensities in the high spatial frequencies to the intensities in the low spatial frequencies as a function of z can be used to determine the z-value at which the region is in focus.

The intensity of the spatial frequencies in the region for a given z-value can be computed by transforming the image of the region with two spatial filters, one passing low spatial frequencies and one passing higher spatial frequencies while attenuating low spatial frequencies. Each filter generates a transformed image, which will be referred to as the low pass and high pass images. Denote the sum of the intensities of the pixels of the low pass image for a given z-value of the stage by $L(z)$. $L(z)$ is a measure of the total energy in the low spatial frequencies. Similarly, denote the sum of the intensities of the pixels in the high pass image for a given z-value of the stage by $H(z)$. $H(z)$ is a measure of the total energy in the high spatial frequency band corresponding to the high spatial frequency filter. The ratio $H(z)/L(z)$ will be maximized at the z-value for which the surface of the specimen in that region is in focus, provided there is sufficient "structure" in the image of that region. If there is insufficient structure, the method that utilizes the maximum value of the intensity of the pixel in question is used.

It should be noted that the maximum value of $H(z)$ is a measure of the degree of structure in the region. In one aspect of the invention, the ratio is used to determine the focus if $H(z)$ is greater than some predetermined threshold value. Similarly, the ratio of $H(z)/L(z)$ is expected to vary more than some threshold value over the range of z values if there is sufficient structure.

The focus method described above depends on filtering the region around the location of interest using filters that pass different bands of spatial frequencies. Such filters are known in image compression applications; however, other spatial filters could be utilized. Sub-band coding transformation such as a wavelet or discrete cosine transformation of the type usually used in image compression could be utilized. For example, a wavelet transformation used in sub-band coding of an image typically generates four sub-images, one with the low spatial frequency components and three with various high spatial frequency components. The sum of the absolute values of the pixel in each of these regions is a measure of the intensity of the corresponding spatial frequencies in the region. Hence, by examining the ratio of the summed intensities in the high spatial frequency sub-images to the sum of the intensities in the low spatial frequency sub-images, a measure of the degree of focus for the region in a given image plane can be obtained. This ratio can then be examined as a function of the z-value of the image planes to arrive at the identity of the image plane that is closest to the plane in which the region is focused. In addition, the location of the z-value at which the region is in focus can be improved by interpolating the ratio as a function of z-value using a quadratic or higher order interpolating algorithm.

In one aspect of the invention, the controller constructs a three-dimensional map of the sample surface from the data in the image planes by assigning a height to each xy location. The height is determined from the z-value at which the location in question is determined to be in focus. The controller uses this map to determine the correct z-axis setting when performing spectral measurements on the sample at the location in question. In addition, the controller displays this map to a user on a display that is part of a user interface 59 shown in FIG. 2. This map aids the user in deciding on locations at which the user might wish to do a spectral scan of the sample. This is particularly useful if the sample includes "particles" embedded in its surface and protruding from the surface. The particles may be of interest for spectral scanning to provide information about the chemical composition of the particles. In addition, if the surface is smooth, but tilted at an angle to the imaging plane, the absorbance information may be altered by the specular reflection from the tilted surface, since the specularly reflected light may be reflected at an angle that is not efficiently collected by focusing lens 55. Accordingly, it may be advantageous to chose a different location on the particle for the spectral measurements.

As noted above, the present invention scans the specimen or parts thereof at a number of different wavelengths in the MIR. The determination of the z-value for which each location in the scanned areas is in focus is preferably repeated at each wavelength to correct for any chromatic aberration in lens 55. Hence, the present invention does not require an expensive achromatic lens that must function over the entire range of wavelengths.

The above-described embodiments utilize a focusing lens that has a small depth of focus. In general there is a trade-off between the lateral resolution of the scanner and the depth of field. For a given wavelength, $\lambda$, the lateral resolution is $d=\lambda/2N_a$. Here, d is the radius of the spot generated by the light on the specimen, and $N_a$ is the numerical aperture of the objective lens. Hence, to reduce d, larger numerical apertures are needed. In practice, the maximum practical value for $N_a$ is about 0.9. The depth of focus is approximately $2\lambda/N_a^2$.

In general, the scanner is designed to accommodate specimens having some maximum variation in height over the specimen. The present invention provides advantages whenever the maximum variation is greater than the depth of focus. In one aspect of the invention, the maximum variation is greater than 2 times the depth of focus.

The number of image planes needed to cover any particular variation in height depends on the depth of focus. In one aspect of the invention the image planes are separated by a distance less than or equal to the depth of focus. Since the depth of focus is proportional to the wavelength of the incident light, in one aspect of the invention, the number of image planes changes in response to changes in the incident wavelength. In another aspect, the number of image planes is set to the number needed to adequately map the surface at the shortest wavelength.

The lateral extent of an image plane can be as small as a single pixel or as large as the entire specimen being scanned. In the case of a single pixel image plane, the z-location of the point on the specimen is determined without moving the xy stage. Once the proper z-location is determined for the point on the specimen, the point can be measured with different wavelengths of incident light to provide a spectrum associated with that point. Since the depth of focus is smallest at the shortest wavelength of interest, it is advantageous to determine the z-location of the point using the shortest wavelength to improve the accuracy of the determination.

The above-describe embodiments utilize a scanning imaging system in which a single point on the specimen is illuminated at any given time. However, other imaging systems could, in principle, also use the teachings of the present invention. In particular, an imaging system with a small depth of field that forms an image by illuminating the entire specimen at once could also form image planes according to the present invention if the depth of focus of the imaging lens is sufficiently small. However, such systems have a number of disadvantages with respect to the scanning systems discussed above, particularly when the illumination source is coherent. The coherent illumination introduces artifacts that include "speckles" that result from the interference of light reflected from neighboring points that are illuminated. These speckles change amplitude and location with the z-value of the stage, and hence, present challenges in determining the correct z-value at which any given point is in focus.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
    a stage adapted to hold a specimen to be imaged and to move said specimen in a first direction and in a second direction that is orthogonal to said first direction;
    a MIR light source that illuminates said specimen at an illumination wavelength, said MIR light source generating a collimated light beam that is focused to a first point on said specimen;
    an imaging system that measures light reflected from said first point, said imaging system being characterized by a depth of focus, said depth of focus being less than a maximum specimen height for which said imaging system is designed, said imaging system forming an image plane of said specimen when said stage is positioned at a second direction distance, z, from a known point in said imaging system; and
    a controller that causes said imaging system to form a plurality of image planes of said specimen at said illumination wavelength, each of said plurality of image planes being characterized by a different value of z, said controller determining a value of z for each of a plurality of points on said specimen at which said point on said specimen is in focus.

2. The apparatus of claim 1 wherein said values of z of said image plane depend on said depth of focus of said imaging system.

3. The apparatus of claim 1 wherein said controller causes said MIR light source to switch said illumination wavelength from a first wavelength to a second wavelength that is different from said first wavelength, said controller causing said imaging system to form a plurality of different image planes of said specimen at each of said first wavelength and said second wavelength, each of said plurality of image planes being characterized by a different value of z, said controller determining a value of z for each of a plurality of points on said specimen at which said point on said specimen is in focus.

4. The apparatus of claim 1 wherein said controller determines said value of z for one of said plurality of points on said specimen at which said point is in focus by determining an intensity for each point in said image planes corresponding to said point.

5. The apparatus of claim 1 wherein said controller determines said value of z for one of said plurality of points on said specimen at which said point is in focus by determining a spatial frequency intensity in a region that includes said point in each of said plurality of image planes.

6. The apparatus of claim 1 wherein said controller generates a three-dimensional image of a surface of said specimen.

7. The apparatus of claim 6 wherein said controller displays said three-dimensional image on a user interface.

8. An apparatus comprising:
a stage adapted to hold a specimen to be imaged and to move said specimen in a first direction and in a second direction that is orthogonal to said first direction;
a MIR light source that illuminates said specimen at an illumination wavelength;
an imaging system, characterized by a depth of focus, said depth of focus being less than a maximum specimen height for which said imaging system is designed, said imaging system forming an image plane of said specimen when said stage is positioned at a second direction distance, z, from a known point in said imaging system; and
a controller that causes said imaging system to form a plurality of image planes of said specimen at said illumination wavelength, each of said plurality of image planes being characterized by a different value of z, said controller determining a value of z for each of a plurality of points on said specimen at which said point on said specimen is in focus,
wherein
said MIR light source comprises a tunable MIR laser that generates a light beam having an illumination wavelength that varies as a function of an input signal; and
said imaging system comprises:
an optical assembly that focuses said light beam to a point on said specimen, said optical assembly comprises a scanning assembly having a focusing lens that focuses said light beam to a point on said specimen and a mirror that moves in a third direction relative to said stage such that said focusing lens maintains a fixed distance between said focusing lens and said stage, said first direction being different from said second direction; and
a first light detector that measures an intensity of light leaving said point on said specimen.

9. The apparatus of claim 8 wherein said controller sets said stage such that a point on said specimen is in focus and measures said intensity of light as a function of said illumination wavelength.

10. A method for scanning a specimen, said method comprising:
illuminating said specimen with a MIR light source at an illumination wavelength while said specimen is on a stage that moves said specimen in a first direction and in a second direction that is orthogonal to said first direction, said MIR light source generating a collimated light beam that is focused to a first point on said specimen;
forming a plurality of different image planes of said specimen at said illumination wavelength by measuring light reflected from said first point with an imaging system characterized by a depth of focus, said depth of focus being less than a maximum specimen height for which said imaging system is designed, said imaging system forming an image plane of said specimen when said stage is positioned at a second direction distance, z, from a known point in said imaging system, each of said plurality of image planes being characterized by a different value of z; and
determining a value of z for each of a plurality of points on said specimen at which said point on said specimen is in focus.

11. The method of claim 10 wherein said values of z of said image planes depend on said depth of focus of said imaging system.

12. The method of claim 10 further comprising causing said MIR light source to switch said illumination wavelength from a first wavelength to a second wavelength that is different from said first wavelength;
causing said imaging system to form a plurality of different image planes of said specimen at each of said first wavelength and said second wavelength, each of said plurality of image planes being characterized by a different value of z; and
determining a value of z for each of a plurality of points on said specimen at which said point on said specimen is in focus.

13. The method of claim 10 wherein determining said value of z for one of said plurality of points on said specimen at which said point is in focus comprises determining an intensity for each point in said image planes corresponding to said point.

14. The method of claim 10 wherein said determining said value of z for one of said plurality of points on said specimen at which said point is in focus comprises determining a spatial frequency intensity in a region that includes said point in each of said plurality of image planes.

15. The method of claim 10 further comprises generating a three-dimensional image of a surface of said specimen.

16. The method of claim 15 further comprises displaying said three-dimensional image on a user interface.

* * * * *